(12) United States Patent
Forstmann

(10) Patent No.: US 7,904,834 B2
(45) Date of Patent: Mar. 8, 2011

(54) BUSINESS SOFTWARE NAVIGATION CONTROL

(75) Inventor: Gerd Forstmann, Schubertstrasse (DE)

(73) Assignee: SAP AG, Walldorf (DE)

( * ) Notice: Subject to any disclaimer, the term of this patent is extended or adjusted under 35 U.S.C. 154(b) by 729 days.

(21) Appl. No.: 11/938,629

(22) Filed: Nov. 12, 2007

(65) Prior Publication Data

US 2009/0125847 A1    May 14, 2009

(51) Int. Cl.
*G06F 3/048* (2006.01)

(52) U.S. Cl. .......... 715/854; 715/765; 715/810; 715/835

(58) Field of Classification Search .................. 715/711, 715/738, 764, 765, 810, 819, 827, 830, 833, 715/834, 835, 853, 854, 856, 862
See application file for complete search history.

(56) References Cited

U.S. PATENT DOCUMENTS

| | | | |
|---|---|---|---|
| 6,340,979 B1* | 1/2002 | Beaton et al. ................. | 715/764 |
| 6,556,225 B1* | 4/2003 | MacPhail ...................... | 715/848 |
| 6,823,325 B1* | 11/2004 | Davies et al. .................. | 706/50 |
| 7,671,782 B2* | 3/2010 | Cleron et al. .................. | 341/176 |
| 2002/0175940 A1* | 11/2002 | Lection et al. ................ | 345/764 |
| 2004/0205514 A1* | 10/2004 | Sommerer et al. .......... | 715/501.1 |
| 2005/0132297 A1* | 6/2005 | Milic-Frayling et al. ..... | 715/745 |
| 2006/0123361 A1* | 6/2006 | Sorin et al. .................... | 715/854 |
| 2007/0273712 A1* | 11/2007 | O'Mullan et al. ............ | 345/650 |
| 2008/0109750 A1* | 5/2008 | Lin-Hendel ................... | 715/785 |
| 2008/0307333 A1* | 12/2008 | McInerney et al. .......... | 715/764 |

* cited by examiner

Primary Examiner — Xiomar Bautista
(74) Attorney, Agent, or Firm — Mintz, Levin, Cohn, Ferris, Glovsky and Popeo, P.C.

(57) ABSTRACT

A graphical user interface control with a plurality of elements can be used to traverse a software application used to effect business processes. In some variations, the control takes the shape of a compass rose with at least two opposite axes, the activation of which cause the information displayed within the software application to become coarser or more granular depending on which of the two axes is selected. Related techniques, apparatus, systems, and articles.

20 Claims, 7 Drawing Sheets

```
Workgroup   PC-WD-Procurement
Ralph Carol
Bryan Jones
Frank Lewis
John Smith
Edgar Zapatki
```

600

BUSINESS SOFTWARE NAVIGATION CONTROL

TECHNICAL FIELD

The subject matter described herein relates to a graphical user interface control for navigating through a business software application.

BACKGROUND

Conventional graphical user interface techniques for traversing business software applications (i.e., software applications to effect business processes, etc.) use selectable menus, clickable elements (e.g., graphical user interface controls, hyperlinks, etc.), modal dialogs, and the like. Some selectable menus may be context-sensitive and so traversal in multiple directions may require re-activation of such menus. With clickable elements, there is typically only a single navigation target available in response to the activation of such clickable element.

SUMMARY

In a first aspect, a widget is initiated during the operation of a business software application that causes a control including a navigation element to be displayed during operation of the business software, application. The navigation element includes a plurality of graphical user interface elements corresponding to at least two axes. User-generated input selecting one of the axes in the navigation element causes initiates traversal within the business software application along a navigation path associated with the selected axis.

In an interrelated aspect, a navigation element is displayed during operation of a business software application. This navigation element comprises a control including, a plurality of graphical user interface elements corresponding to at least three axes, at least two of the axes being opposing. Selection of a first opposing axis initiates traversal within the business software application in a first direction along a first navigation path. Selection of a second opposing axis opposite the first opposing axis initiates traversal within the business software application in a second direction opposite to the first direction along the first navigation path. Selection of an axis other than an opposing axis initiates transversal within the business software application along a second navigation path. User-generated input selecting one of the axes in the navigation element is received which results in the initiation of traversal within the business software application based on the selected axis.

The navigation element may take any of a variety of shapes. The graphical user interface elements may additional take any variety of shapes and can be positioned in a variety of spatial layouts. In some variations, the navigation element is similar in appearance to a compass rose. In other variations the navigation element comprises at least to segmented n concentric (i.e., nested, etc.) circular members.

In order to facilitate traversal via the controls, one or more preview elements can be displayed adjacent to or overlapping at least one of the axes. Such preview elements contain text characterizing a preview of a navigation path associated with the corresponding axis. The preview elements can be displayed when the corresponding graphical user interface element is selected and/or as a tooltip.

One of the graphical user interface elements can be used to allow the traversal to a most recently traversed state (i.e., a user can go backwards in history).

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current techniques allow for more efficient traversal of business software applications. By mapping similar business navigation options on a set of standard axes, the user can quickly navigate through the system with minimal selections. In addition, the typical "backtracking" and branchlike navigation pattern can be converted into a topology with fewer dead ends.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
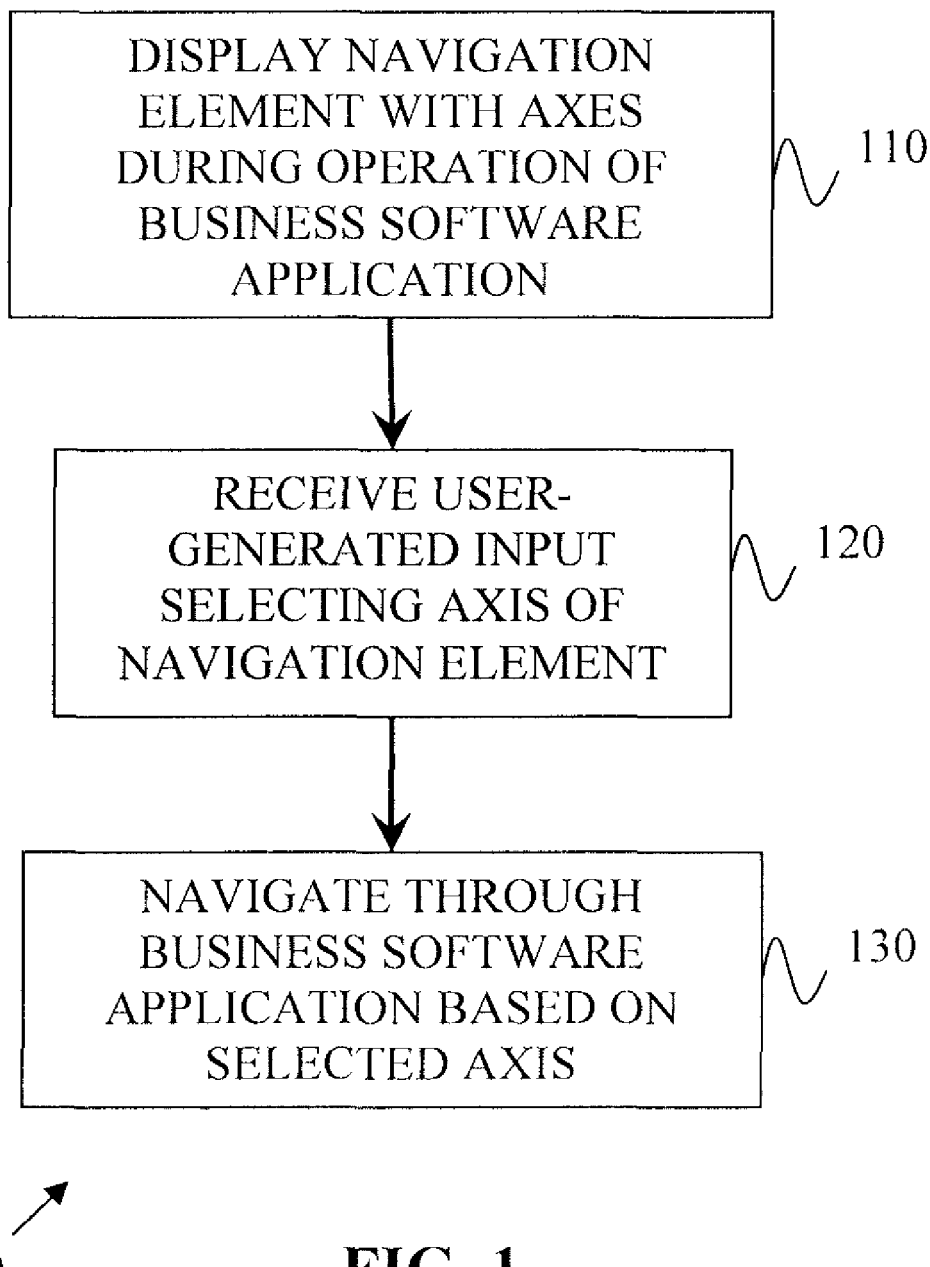
FIG. 1 is a process flow diagram illustrating a method of reusing business logic.

FIG. 1 is a process flow diagram illustrating a method 100 in which, at 110, a navigation element is displayed during operation of a business software application. The navigation element can comprise a control including a plurality of graphical user interface elements corresponding to at least three axes where at least two of the axes oppose each other. Selection of a first opposing axis initiates traversal within the business software application in a first direction along a first navigation path. Selection of a second opposing axis opposite the first opposing axis initiates traversal within the business software application in a second direction opposite to the first direction along the first navigation path. Selection of an axis other than an opposing axis initiates traversal within the business software application along a second navigation path. User-generated input selecting one of the axes in the navigation element is, at 120, received. Thereafter, at 130, traversal in the business software application along the navigation path corresponding to the selected axis is initiated.

The following describes navigation techniques which are applicable to a wide variety of user interfaces utilized by software application used to effect business processes (i.e., business software applications). The navigation can be based on a graphical user interface (GUI) control displaying available "options" mapped on a GUI elements within the control. In one example, the format of the control is analogous to a compass rose (and for purposes of this disclosure, the GUI control may be referred to as a compass). The axes of the compass (N, E, S, W, etc.) describe business navigation options such as, for example, "Time" (When), "Content/Details" (What), "Space" (Where), "Who", and the like. Axes of the compass rose can be color coded or otherwise visually distinguished from each other in order to facilitate rapid conveyance of information to a user. Moreover, the control can take a variety of shapes, and in some implementations, includes a plurality of circular segments, which can in some variations, be nested or concentric.

In implementations in which the business software application is available via a browser, the control can be provided via a widget. A widget is a portable chunk of code that can be installed and executed within any separate HTML-based web page by an end user without requiring additional compilation. A widget can also be referred to as a gadget, badge, module, capsule, snippet, mini and flake. The widgets can use, for example, DHTML, Adobe Flash or JavaScript programming languages.

Figure 2:
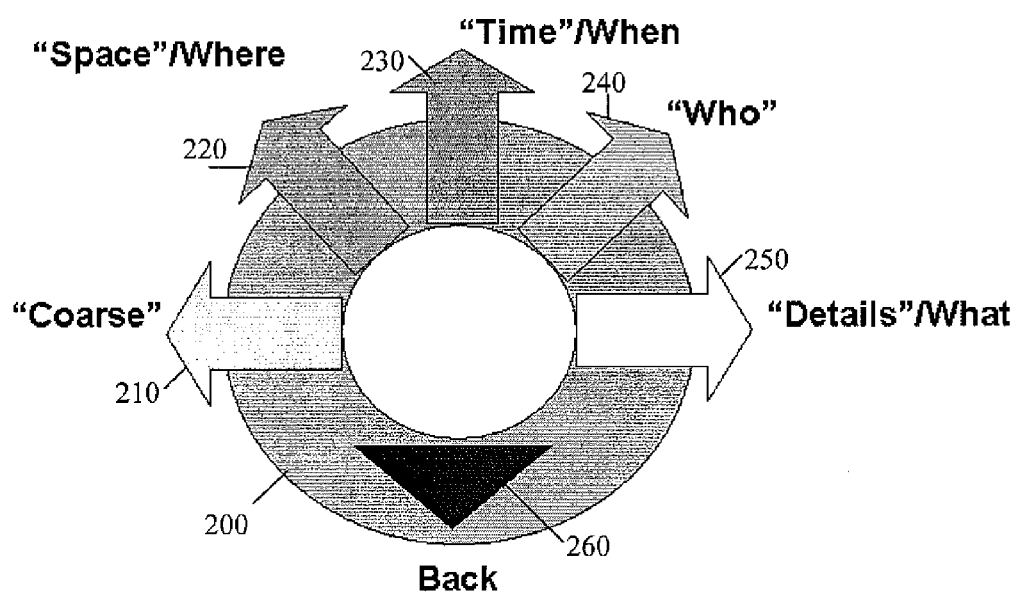
FIG. 2 is a diagram illustrating a first control for navigating a business software application.

FIG. 2 illustrates a control 200 having a plurality of GUI elements 210-260 the activation of which initiates traversal of a software application to effect business processes (i.e., a business software application) along a navigation path associated with the activated GUI element 210-260. A first GUI element 210 can relate to a level of coarseness so that a higher level of information can be displayed. A second GUI element 220 can relate to localization information (e.g., space, where, etc.). A third GUI element 230 can relate to temporal information (e.g., time, when, etc.). A fourth GUI element 240 can relate to information about a user or group (e.g., who, etc.). A fifth GUI element 250 which can be positioned opposite to that of the first GUI element 210, can relate to a finer granularity of information currently being displayed (which is opposite to the first GUI element 210 which provides a coarser granularity of the information currently being displayed). A sixth GUI element 260 can allow a user to cause the software application to revert to a most recent state (either as a whole or partially). In other words, the sixth GUI element 260 can allow a user to access his or her navigation history generated while using the software application.

Figure 3:
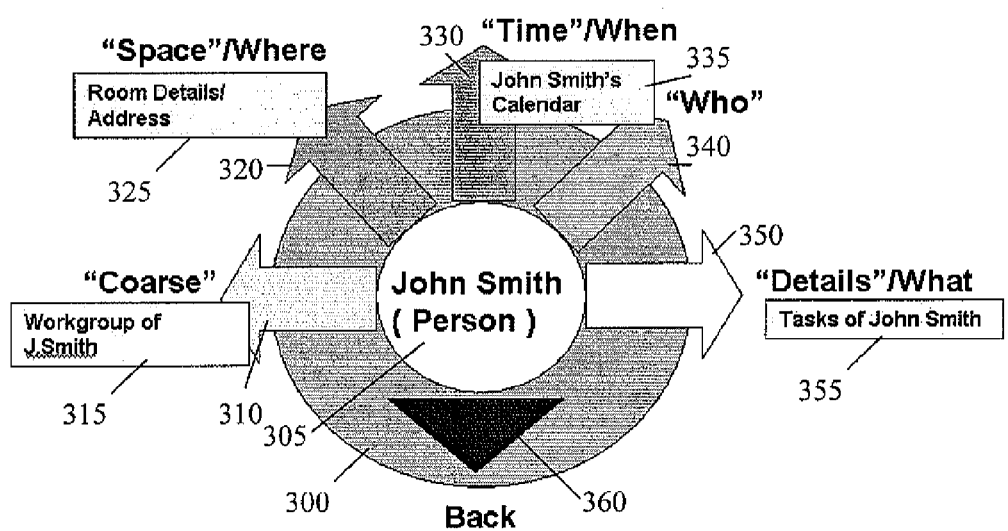
FIG. 3 is a diagram illustrating a second control for navigating a business software application.

FIG. 3 illustrates a control 300 (similar to the control 200 in FIG. 2) having a plurality of GUI elements 310, 320, 330, 340, 350, 360 the activation of which initiates traversal of a software application to effect business processes (i.e., a business software application) along a navigation path associated with the activated GUI element 310-360. In addition, in this implementation, at least a subset of the GUI elements 310, 320, 330, 340, 350, 360 have preview elements 315, 325, 335, 355 associated therewith which can be displayed in connection with the GUI elements. The preview elements 315, 325, 335, 355 can be permanently displayed, or in the alternative, as a tooltip or when the corresponding GUI element 320, 330, 340, 350, 350 is activated. Moreover, a current context element 305 may be displayed that includes contextual information about a current state of the software application. As will be noted in FIG. 3, the control 300 takes the form of a compass rose with the GUI elements 320, 330, 340, 350, 350 being associated with axes of the compass rose, preview elements 315, 325, 335, 355 being displayed on or adjacent to the corresponding axis, and the current context element 305 being displayed in the center of the compass rose. Navigation through the various axes may be accomplished, for example, through an input device such as a mouse, or quick keys (e.g., arrows, number pad, etc.) may be used to activate the various axes of the compass rose.

Figure 4:
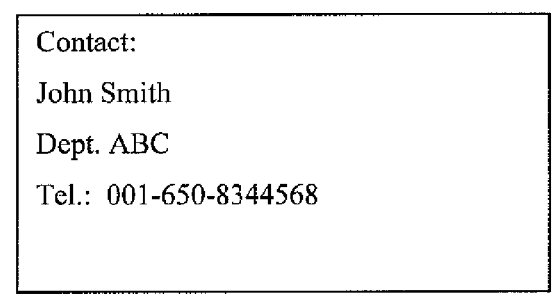
FIG. 4 is a screenshot of the business software application displayed in connection with the second control of FIG. 3.

A screen 400 as illustrated in FIG. 4 may be displayed in connection with the control 300 of FIG. 3. This screen 300 relates to contact information for a user associated with the software application, namely John Smith. In the control 300, in the current context element 305, the name John Smith is presented, optionally with a parenthetical identifying him as a person (other entity types can also be displayed). By activating a first GUI element 310 associated with coarseness, the GUI element 310 having a corresponding preview element 315 displaying a higher level of information, information regarding the workgroup of John Smith can be displayed (see screen 600 of the software application illustrated in FIG. 6). By activating a second GUI element 320 associated with localization, the second GUI element 320 having a corresponding preview element 325 displaying information characterizing a locale of John Smith, localization information, such as the office number, address, etc. of John Smith would be displayed in the software application. By activating a third GUI element 330 regarding temporal/calendar information, the third GUI element 330 having a preview element 335 displaying information characterizing temporal information of John Smith, information such as the calendar of John Smith can be displayed in the software application. By activating a fourth GUI element 340 associated with individuals or entities associated with a current state of the software application, further information can be provided regarding same. By activating a fifth GUI element 350 associated with a more granular view of the current state of the application, the fifth GUI element 350 having a preview element characterizing the activating of GUI element 355, information such as the tasks of John Smith can be displayed in the software application. A sixth GUI element 360 can be activated to cause the software application to go "back" and revert to a prior context/information state.

Figures 5, 6:
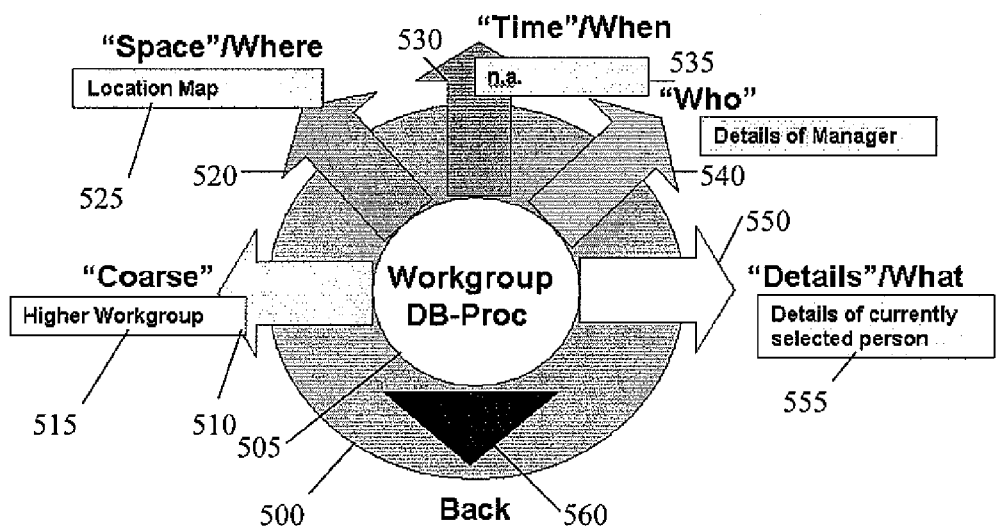
FIG. 5 is a diagram illustrating a third control for navigating a business software application.
FIG. 6 is a screenshot of the business software application displayed in connection with the third control of FIG. 5.

By activating the first GUI element 310 of FIG. 3, the screen 600 of FIG. 6 as well as a control 500 can be displayed (replacing the control 300 of FIG. 3 and the screen 400 of FIG. 4). A first GUI element 510 on the control 500 can relate to a level of coarseness so that a higher level of information can be displayed. A second GUI element 520 can relate to localization information (e.g., space, where, etc.). A third GUI element 530 can relate to temporal information (e.g., time, when, etc.). A fourth GUI element 540 can relate to information about a user or group (e.g., who, etc.). A fifth GUI element 550 which can be positioned opposite to that of the first GUI element 510, can relate to a finer granularity of information currently being displayed (which is opposite to the first GUI element 510 which provides a coarser granularity of the information currently being displayed). A sixth GUI element 560 can allow a user to cause the software application to revert to a most recent state (either as a whole or partially). The GUI elements 510, 520, 530, 540, 550 can include preview elements 515, 525, 535, 545, 555 which display information characterizing the activation of the corresponding GUI element 510, 520, 530, 540, 550. Additionally, a current context element 505 displays information characterizing a current context of the software application (in this case, work group database procedures in the screen 600 of FIG. 6).

Figures 7, 8:
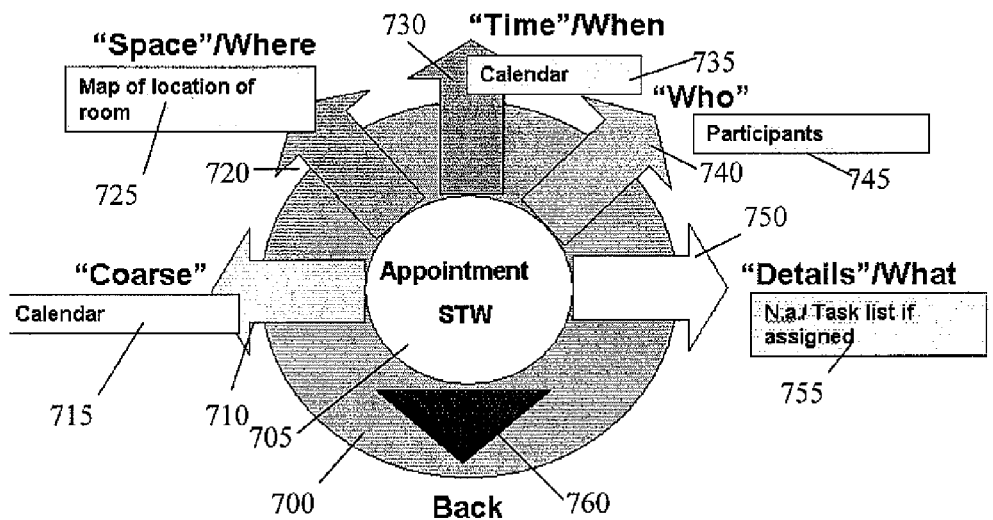
FIG. 7 is a diagram illustrating a fourth control for navigating a business software application.
FIG. 8 is a screenshot of the business software application displayed in connection with the fourth control of FIG. 7.

FIG. 7 illustrates a control 700 relating to an appointment displayed in a screen 800 of FIG. 8. A first GUI element 710 on the control 700 can relate to a level of coarseness so that a higher level of information can be displayed. A second GUI element 720 can relate to localization information (e.g., space, where, etc.). A third GUI element 730 can relate to temporal information (e.g., time, when, etc.). A fourth GUI element 740 can relate to information about a user or group (e.g., who, etc.). A fifth GUI element 750 which can be positioned opposite to that of the first GUI element 710, can relate to a finer granularity of information currently being displayed (which is opposite to the first GUI element 710 which provides a coarser granularity of the information currently being displayed). A sixth GUI element 760 can allow a user to cause the software application to revert to a most recent state (either as a whole or partially). The GUI elements 710, 720, 730, 740, 750 can include preview elements 715, 725, 735, 745, 755 which display information characterizing the activation of the corresponding GUI element 710, 720, 730, 740, 750. Additionally, a current context element 705 displays information characterizing a current context of the software application (in this case, a meeting request/calendar event for the STW project in the screen 800 of FIG. 8).

Figure 9:
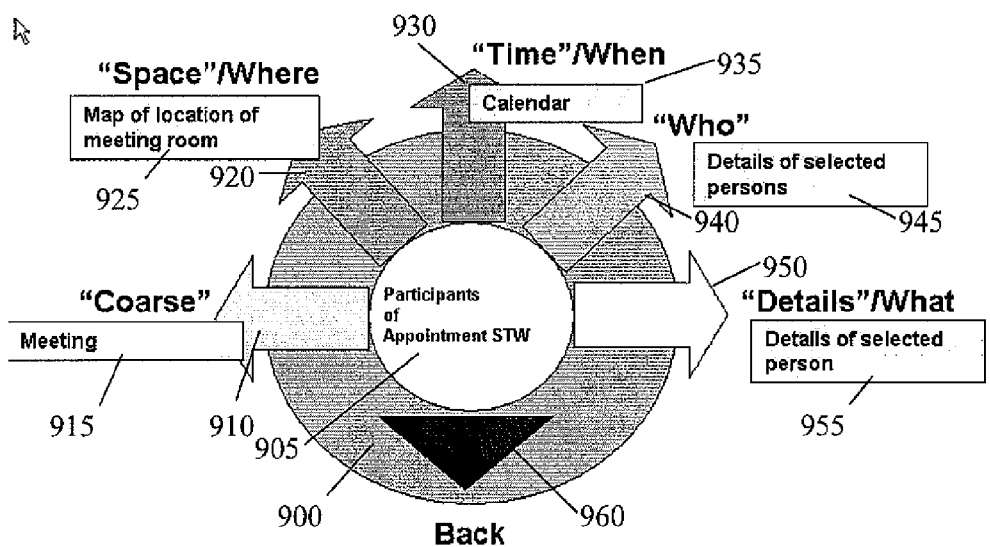
FIG. 9 is a diagram illustrating a fifth control for navigating a business software application.
Figure 10:
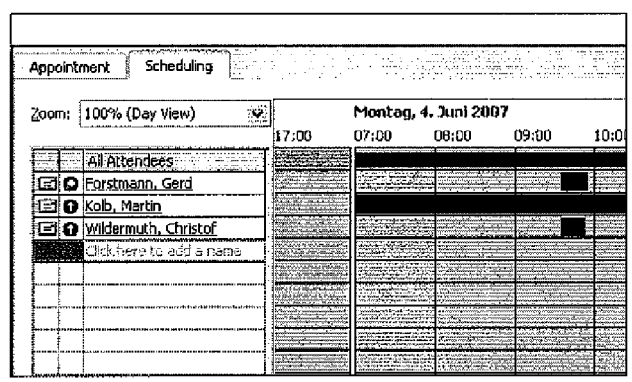
FIG. 10 is a screenshot of the business software application displayed in connection with the fifth control of FIG. 9.

By activating the fourth GUI element 740, a screen 1000 as illustrated in FIG. 10 can be displayed along with a control 900 as illustrated in FIG. 9 (replacing the control 700 of FIG. 7 and the screen 800 of FIG. 8). A first GUI element 910 on the control 900 can relate to a level of coarseness so that a higher level of information can be displayed. A second GUI element 920 can relate to localization information (e.g., space, where, etc.). A third GUI element 930 can relate to temporal information (e.g., time, when, etc.). A fourth GUI element 940 can relate to information about a user or group (e.g., who, etc.). A fifth GUI element 950 which can be positioned opposite to that of the first GUI element 910, can relate to a finer granularity of information currently being displayed (which is opposite to the first GUI element 910 which provides a coarser granularity of the information currently being displayed). A sixth GUI element 960 can allow a user to cause the software application to revert to a most recent state (either as a whole or partially). The GUI elements 910, 920, 930, 940, 950 can include preview elements 915, 925, 935, 945, 955 which display information characterizing the activation of the corresponding GUI element 910, 920, 930, 940, 950. Additionally, a current context element 905 displays information characterizing a current context of the software application (in this case, participants of the STW project in the screen 1000 of FIG. 10).

Table 1 below illustrates examples of how a control as described herein can be used within different scenarios of a software application.

TABLE 1

| CurrentContext | Dimension/Axis | Dimension (Meaning) | |
|---|---|---|---|
| Me | "Time" | | My Calendar |
| | "Space" | | My Room |
| | "Owner/Up" | | My Manager |
| | "Content" | | My E-mail (if in outlook) |
| Person | Time | | His Calendar |
| | "Space/Where" | | His Room |
| | Custom | | |
| Time (slot) | "Space/Where" | | Meeting Room-Booking |
| | "Contents" | | Participants selection |
| Calendar | When/Details | Specific Entry | |
| | Who | Person | |
| | Details | Specific Entry | |
| Appointment | "Space" | Room | |
| Appointment | "Who" | Participants | |
| Appointment | "Details" | Meeting Topics | |
| Appointment | Up/Coarse | | |
| Meeting Room | Time | | Room booking schedule |
| | Where | Map | |
| | Who | | N.A. (or Secretary responsible for this room/Facility management) |
| Office Room | Space | | Physical map |
| Office Room | "Contents" | People within Office | |
| Office Room | Owner/Up | | Building/Location |
| (Meeting) Room | Space | | Physical Map |
| | Time | | Room occupancy |
| | "Owner" | | Secretary who can book room/ |
| | Custom | Control Contact | Secretary who can book room |
| Order | "Contents" | | Order Items |
| | "Owner/Who" | Customer | |
| | "Where" | Map/Assigned plant | Current location |
| | "Time/When" | Processing stage/Production plan | Processing schedule |
| Software Code | "Contents" | FileContent | Actual file content |
| | "Owner" | Person | Programmer |
| | Coarse/Up | Project | Project |
| | "Space/Where" | Repository | Revision server |
| | "Time/When" | Revision History | Revision history |

In addition, in some implementations, there may be two "who" axes. For example, the "Customer/Owner" on one axis and the "Processor/Handler/TaskOwner" on another axis. Alternatively, the "Meeting Owner" on one axis and the "Participant" on a second axis.

Figure 11:
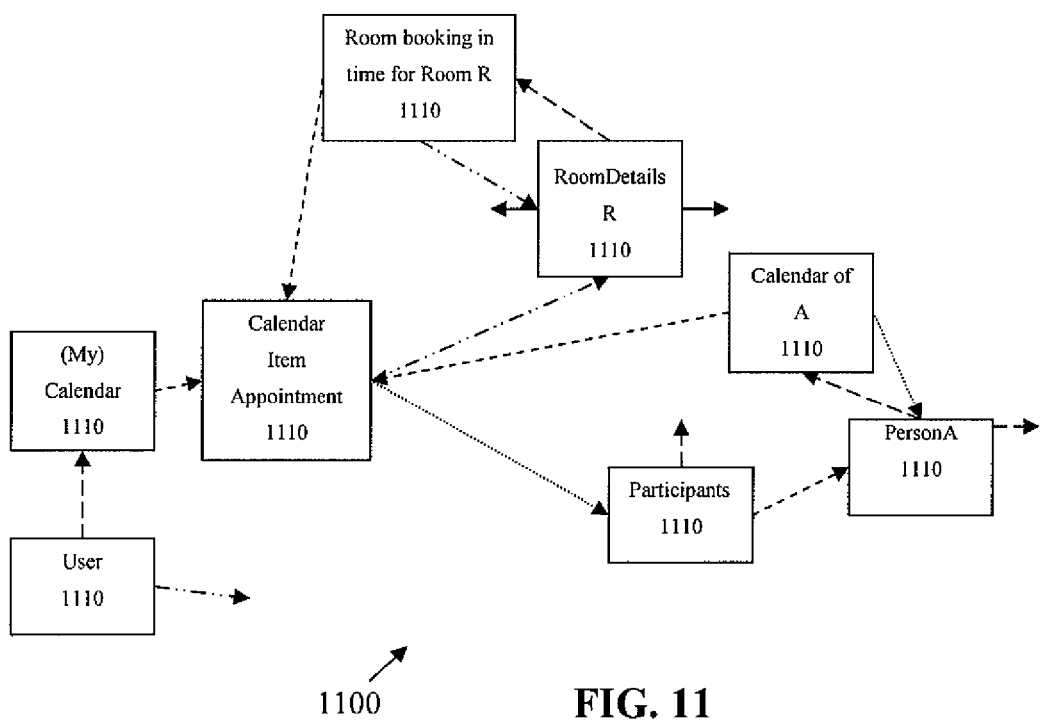
FIG. 11 is a diagram illustrating sample navigation paths.

FIG. 11 is a diagram 1100 illustrating sample navigation paths among context states 1110 that may be traversed using a control such as control 200 in FIG. 2. In this example, long dash dot dot lines can correspond to navigation using the second GUI element 220 ("space/where"). Long dash lines can correspond to navigation using the third GUI element 230 ("time/when"). Square dot lines can correspond to navigation using the fourth GUI element 240 ("who"). The short dash lines can corresponds to navigation using the fifth GUI element 250 ("details/what").

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a tangible machine-readable medium embodying instructions that when performed by one or more machines result in operations comprising:

displaying a navigation element during operation of a business software application to effect a business process, the navigation element comprising a control including a plurality of graphical user interface elements corresponding to at least three axes, at least two of the axes being opposing, selection of a first opposing axis initiating traversal within the business software application in a first direction along a first navigation path and selection of a second opposing axis opposite the first opposing axis initiating traversal within the business software application in a second direction opposite to the first direction along the first navigation path, selection of an axis other than an opposing axis initiating traversal within the business software application along a second navigation path;

receiving user-generated input selecting one of the axes in the navigation element; and initiating traversal within the business software application based on the selected axis;

wherein traversal in the first direction causes information associated with the business process at a higher level to be displayed; and wherein traversal in the second direction causes information associated with the business processes at a finer level to be displayed.

2. An article as in claim 1, wherein the navigation element is displayed as a compass rose.

3. An article as in claim 1, wherein the navigation element comprises at least two segmented concentric circular members.

4. An article as in claim 1, wherein the tangible machine-readable medium further embodies instructions that when performed by one or more machines result in operations comprising:

displaying one or more preview elements adjacent to or overlapping at least one of the axes, the preview elements containing text characterizing a preview of a navigation path associated with the corresponding axis.

5. An article as in claim 4, wherein the one or more preview elements associated with the corresponding axis are displayed in connection with a selection or mouse-over of the axis.

6. An article as in claim 1, wherein selection of at least one of the axes initiates the business software application to revert to a most recently traversed state.

7. An article as in claim 1, wherein the navigation element comprises a widget.

8. An article comprising a tangible machine-readable medium embodying instructions that when performed by one or more machines result in operations comprising:

initiating a widget during the operation of a business software application to effect a business process, the widget causing a control including a navigation element to be displayed during operation of the business software application, the navigation element comprising a plurality of graphical user interface elements corresponding to at least four axes;

receiving user-generated input selecting one of the axes in the navigation element; and initiating traversal within the business software application along a navigation path associated with the selected axis; wherein:

a first axis of the navigation element includes a first graphical user interface element, which when activated, displays a higher level of information associated with the business process;

a second axis of the navigation element includes a second graphical user interface element, which when activated, displays localization information associated with the business process;

a third axis of the navigation element includes a third graphical user interface element, which when activated, displays temporal information associated with the business process; and a fourth axis of the navigation element includes a fourth graphical user interface element, which when activated, displays user or group information associated with the business process.

9. An article as in claim 8, wherein the navigation element is displayed as a compass rose.

10. An article as in claim 8, wherein the navigation element comprises at least two segmented concentric circular members.

11. An article as in claim 8, wherein the tangible machine-readable medium further embodies instructions that when performed by one or more machines result in operations comprising:

displaying one or more preview elements adjacent to or overlapping at least one of the axes, the preview elements containing text characterizing a preview of a navigation path associated with the corresponding axis.

12. An article as in claim 11, wherein the one or more preview elements associated with the corresponding axis are displayed in connection with a selection or mouse-over of the axis.

13. An article as in claim 8, wherein selection of at least one of the axes initiates the business software application to revert to a most recently traversed state.

14. A method comprising:

initiating a widget during the operation of a business software application, the widget causing a control including a navigation element to be displayed during operation of the business software application, the navigation element comprising a plurality of graphical user interface elements corresponding to at least six axes;

receiving user-generated input selecting one of the axes in the navigation element; and initiating traversal within the business software application along a navigation path associated with the selected axis; wherein:

a first axis of the navigation element includes a first graphical user interface element, which when activated, displays a higher level of information associated with the business process;

a second axis of the navigation element includes a second graphical user interface element, which when activated, displays localization information associated with the business process;

a third axis of the navigation element includes a third graphical user interface element, which when activated, displays temporal information associated with the business process;

a fourth axis of the navigation element includes a fourth graphical user interface element, which when activated, displays user or group information associated with the business process.

a fifth axis of the navigation element includes a fifth graphical user interface element, which when activated, displays a lower level of information associated with the business process, the fifth axis being opposite to the first axis;

a sixth element of the navigation element includes a sixth graphical user interface element, which when activated, allows a user to access his or her navigation history.

15. A method as in claim 14, wherein the navigation element is displayed as a compass rose.

16. A method as in claim 14, wherein the navigation element comprises at least two segmented concentric circular members.

17. A method as in claim 14 further comprising:

displaying one or more preview elements adjacent to or overlapping at least one of the axes, the preview elements containing text characterizing a preview of a navigation path associated with the corresponding axis.

18. A method as in claim 17, wherein the one or more preview elements associated with the corresponding axis are displayed in connection with a selection or mouse-over of the axis.

19. A method as in claim 14, wherein selection of at least one of the axes initiates the business software application to revert to a most recently traversed state.

20. A method as in claim 14, wherein the navigation element includes a current context element displaying a current context of the business software application.

* * * * *